Feb. 17, 1953  R. A. OETJEN  2,628,533
IMAGE FORMING OPTICAL REFLECTING
AND CONVERGING MIRROR DEVICE
Filed Oct. 17, 1951
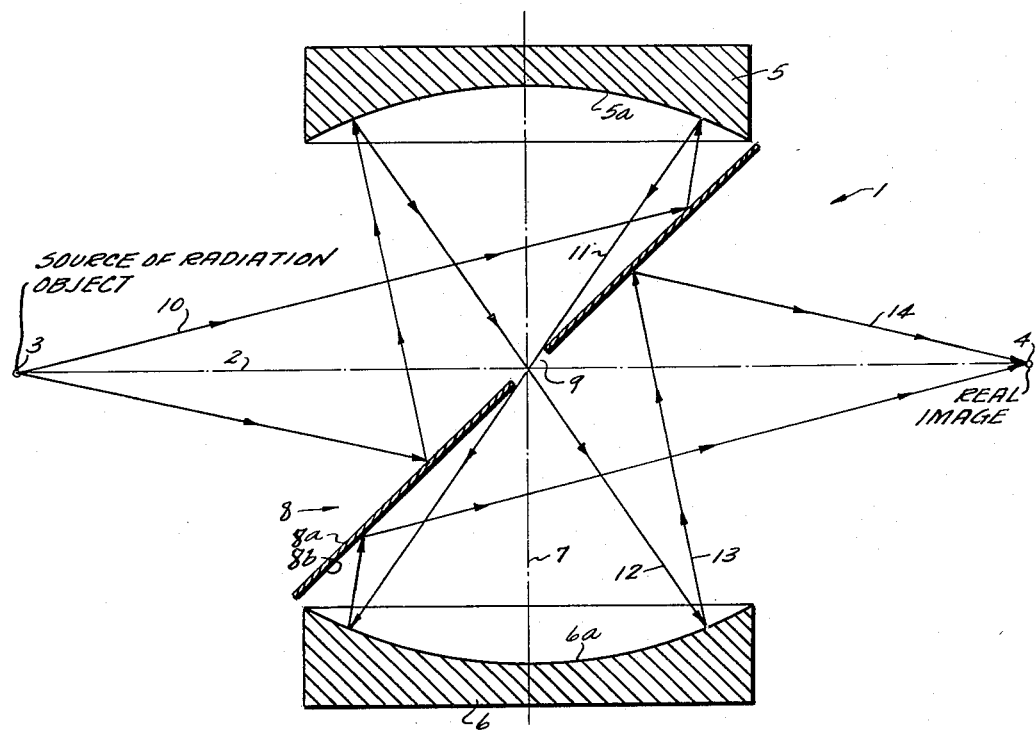
INVENTOR.
ROBERT A. OETJEN Patented Feb. 17, 1953

2,628,533

UNITED STATES PATENT OFFICE 2,628,533

IMAGE FORMING OPTICAL REFLECTING AND CONVERGING MIRROR DEVICE

Robert A. Oetjen, Columbus, Ohio, assignor to the United States of America as represented by the Secretary of the Air Force Application October 17, 1951, Serial No. 251,659

5 Claims. (Cl. 88—57)

The invention described herein may be manufactured and used by or for the Government for governmental purposes without payment to me of any royalty thereon.

This invention is an optical device in which a beam of divergent radiation rays from an object, or radiation source at one side of the device is reflected by a combination of opposed concave reflectors and plane parallel reflecting surfaces to produce a real image at the center of the parallel reflecting surfaces, or produce a beam of converging rays reflected from one concave reflecting surface to the other concave reflecting surface through a point at the center of the plane reflecting surfaces in which the beam of rays is twice reflected, by the opposite sides of the plane reflecting surfaces, to form a convergent beam of rays passing through a couvergence point at a predetermined distance from the radiation source at the opposite side of the device.

The invention involves an arrangement of concave and plane reflecting surfaces in which a plane or flat mirror is silvered or aluminized on its opposite sides and disposed in inclined relation to the primary axis of a diverging beam from the source of radiation and inclined to the axis of the beam through the optical device, a pair of opposed concave mirrors being disposed on an intersecting axis transverse to the aforesaid primary axis, extending at opposite sides of the inclined plane mirror, the transverse axis passing through an aperture formed at the center of the plane mirror, and intersecting the primary axis at the center of the plane mirror with the concave reflecting surfaces of the concave mirrors facing each other and toward the plane mirror, whereby a diverging beam of radiation rays emanating from the concentrated radiation source or object on the primary axis will strike the near surface of the inclined plane mirror and be reflected thereby to one of the concave reflectors, to be reflected thereby as a converging beam on the second mentioned or transverse axis, passing through the aperture in the center of the inclined mirror to form a diverging beam striking the other or opposed concave reflecting surface, to be reflected thereby as a converging beam striking the opposite reflecting surface of the plane mirror, to be reflected thereby, on the primary axis to a convergence point on the primary axis at the side of the optical device opposite from the radiation source.

One-half of the device shown in the drawings could be used satisfactorily, if desired. A real image could be produced in the aperture of the plane mirrors, or the source could be placed in this aperture to produce the real image at a point away from the device.

The optical device serves a function similar to that of a lens, but due to the fact that there are no absorbing media in the path of the rays, other than air or a vacuum, it may be used for radiation of all wave lengths including infrared. The combination of mirrors does not exactly function like a lens in that there are not unique conjugate points. Rather, for a given setting of the two concave mirrors, there will be a fixed pair of object and image points. If either the object or the image is to be displaced, it is necessary to move one or the other concave mirrors. It has the advantage of providing a lens with a "variable focal length" in which no absorbing media is disposed in the path of the beam between the object and image points.

Other objects and advantages of the invention will become apparent with reference to the following specification and accompanying drawing in which like reference characters refer to like parts.

Referring to the drawing, the reference numeral 1 denotes the improved optical device generally, having a primary or major axis 2 on which are located the object or source of radiation 3 and the concentrated radiation point or image 4. A pair of opposed concave reflectors 5 and 6 are disposed at opposite sides of the major axis 2 on a transverse or minor axis 7 intersecting the major axis 2 at some predetermined angle, for instance 45° as shown in the drawing, substantially mid-way between the object 3 and the image 4.

The reflectors 5 and 6 have concave and preferably ellipsoidal mirror reflecting or mirror surfaces 5a and 6a disposed on their front or concave faces.

A plane reflector or mirror 8 is inclined across the major and minor axes 2 and 7 at a predetermined angle, for instance at substantially 45°, the plane reflector preferably being extremely thin and having its opposite faces "silvered" or aluminized to form parallel plane mirror surfaces 8a and 8b facing respectively the object 3 and the concave reflecting surface 5a, and the image 4 and the concave reflecting surface 6a. At the center of the plane mirror 8 is an opening 9 which surrounds the point of intersection of the major and minor axes 2 and 7.

The concave reflectors 5 and 6 are disposed with respect to point of intersection of the axes 2 and 7, such that the diverging rays of the inlet beam 10, reflected by the reflecting surface 8a will strike the concave reflecting surface 5a, and become reflected thereby as a converging beam 11, forming a real image of the object 3 in the central opening 9, the converging rays of the beam 11 crossing at this point to form an expanding beam 12 of diverging rays which strikes the other concave mirror surface 6a to be reflected thereby to form the converging beam 13, the contracting beam 13 striking the opposite mirror reflecting surface 8b of the plane mirror 8 and reflected thereby to form the converging outgoing beam 14 of rays converging at the image plane on the major axes 2 to reproduce an image of the object 3 in the image plane at 4.

All of the rays of the beam 10 emanating from the radiation source 3 passes through thhe opening 9 in the plane mirror 8 after being reflected twice to become the beam 11, and therefore the optical device can be used with or for any kind of rays including infrared since there is no obstructing media in the path of the rays. The plane inclined mirror 8 should be very thin and should be opaque or the radiation rays will not be blocked. The two reflecting surfaces 8a and 8b are preferably parallel to each other. One form of reflector that may be used may comprise a stretched plastic film having its opposite surfaces silvered or aluminized and highly polished. It must, of course, have the aperture 9 therethrough.

If either the object or the image is displaced, it will be necessary to move one or the other concave mirrors along the minor axis 7. This has the advantage of providing a "lens" with a variable focal length. For a given setting of the two concave mirrors, there will be a fixed pair of object and image points.

What I claim is:

1. In an optical device for transmitting a beam of diverging rays emanating from a source of radiation at one point to form a real image of the source of radiation at a spaced point, said device having a major axis containing the radiation source and a minor axis intersecting the major axis perpendicular to the major axis, a plane reflector inclined across the major axis, having an opening therethrough at the point of intersection of the major and minor axes for passage of the emanating converging rays therethrough, said plane reflector having parallel plane reflecting surfaces at its opposite sides, a pair of concave reflectors disposed on the minor axis at opposite sides of the inclined plane reflector, said concave reflectors having concave reflecting surfaces facing each other, one of said concave reflectors being disposed to receive a diverging beam of rays emanating from the radiation source toward the inclined reflector, to be reflected by the inclined reflector to one of the concave reflecting surfaces, and reflected by the concave reflecting surface to form a convergent beam of rays having an image point at the point of intersection of the major and minor axes, said other concave reflector being disposed to receive the beam of rays from the last mentioned point and reflect the expanding beam to provide a converging beam striking the opposite reflecting surface of the inclined plane reflector to be reflected thereby through a convergence point on the major axis to form a real image of the radiation source at the last mentioned convergence point.

2. In an optical device for transmitting a beam of emanating rays from a source of radiation at one side of the optical device to form a real image of the source of radiation at the opposite side of the optical device, said device comprising a plane reflector having plane parallel reflecting surfaces at its opposite sides, adapted to be disposed at an inclined angle to a diverging beam of radiation from the radiation source, said plane reflector having a central aperture therethrough adapted to be disposed on the axis of the diverging beam, a pair of concave reflectors disposed at opposite sides of the inclined reflector on a common axis transverse to the axis of the diverging beam, said concave reflectors having concave reflecting surfaces facing each other and the adjacent face of the reflecting surfaces of the inclined reflector, with the transverse axis extending through the aperture in the plane reflector, one of said concave reflectors being disposed to receive the diverging beam from the radiation source after reflection thereof by one of the plane reflecting surfaces, to reflect the beam as a converging beam through a point in said aperture in the plane reflector, the other concave reflector being disposed to receiver the expanding portion of the beam from the last mentioned point and reflect the same to form a converging exit beam striking the other plane reflecting surface of the inclined plane reflector to be reflected thereby through a convergence point to form a real image of the radiation source at the last mentioned convergence point.

3. In an optical device for receiving rays emanating from a radiation source at one side of the device to form a real image of the radiation source at the opposite side of the device, said device having a major axis adapted to pass through the radiation source and the real image of the radiation source, a plane reflector inclined across the major axis at 45°, having parallel plane reflecting surfaces at its opposite faces, with an opening therethrough having its center disposed substantially on the major axis, a pair of concave reflectors disposed at opposite sides of the plane reflector on a common axis passing through the opening and intersecting the major axis in the opening at 90°, in 45° angular relation to the inclined reflector, said concave reflectors having concave reflecting surfaces facing the point of intersection of the major and common axes and spaced from the intersecting point in opposite directions; whereby a source of radiation disposed in the opening at the point of intersection of the axes will be reflected by each concave reflecting surface to the adjacent plane reflecting surface of the inclined reflector and be reflected by the said plane reflecting surfaces in opposite direction away from each other along the major axis to produce second sources of radiation from the first source of radiation on the major axis at opposite sides of the device.

4. In an optical device having a major axis, and a minor axis perpendicular to the major axis, a plane reflector inclined across the major axis and passing through the point of intersection of the axes, said inclined reflector having an opening therethrough surrounding the axes intersection point, and provided with plane parallel reflecting surfaces on its opposite sides, a pair of concave reflectors having their axes in contiguous relation to the minor axis and formed with concave reflecting surfaces facing the point of intersection of the major and minor axes, said concave reflecting surfaces having ellipsoidal contours, whereby a beam of divering rays emanating from an object source of radiation located on the major axis at one side of the device will strike one face of the inclined plane reflector and be reflected thereby to one ellipsoidal contour reflecting surface of one of the concave reflectors and be reflected thereby to form a converging beam on the minor axis passing through the opening in the plane reflector to form a real image of the radiation source at the convergence point, to form a diverging beam from the convergence point striking the other ellipsoidal contour surface, and reflected thereby to the opposite plane reflecting surface to form a converging beam reflected thereby through a convergence point on the major axis at the opposite side of the device, to form a real image of the radiation source at the last mentioned convergence point.

5. In an infrared lens device having a major axis adapted to be lined up with an infrared source, a plane reflector having a plane reflecting surface inclined across the major axis and formed with an aperture having its center disposed substantially on the major axis, an ellipsoidal concave reflecting surface disposed at one side of the plane reflector on a transverse minor axis, intersecting the major axis substantially at the center of said aperture and the plane of the plane reflecting surface, said ellipsoidal concave reflecting surface to receive the rays reflected from the infrared source by said plane reflecting surface and forming a real image of the infrared source substantially at the center of said aperture at the intersection of said major and minor axes.

ROBERT A. OETJEN.

REFERENCES CITED

The following references are of record in the file of this patent:

UNITED STATES PATENTS

| Number | Name | Date |
| --- | --- | --- |
| 804,996 | Anthony | Nov. 21, 1905 |
| 1,053,650 | Saalburg | Feb. 18, 1913 |
| 1,552,451 | Roach | Sept. 8, 1925 |
| 1,763,630 | Hopkins | June 10, 1930 |
| 2,327,947 | Warmisham | Aug. 24, 1943 |
| 2,441,160 | Martin | May 11, 1948 |
| 2,476,124 | Van Alphen | July 12, 1949 |